L. H. JOHNSON.
HEN'S NEST.
APPLICATION FILED JULY 6, 1921.
1,433,460.
Patented Oct. 24, 1922.
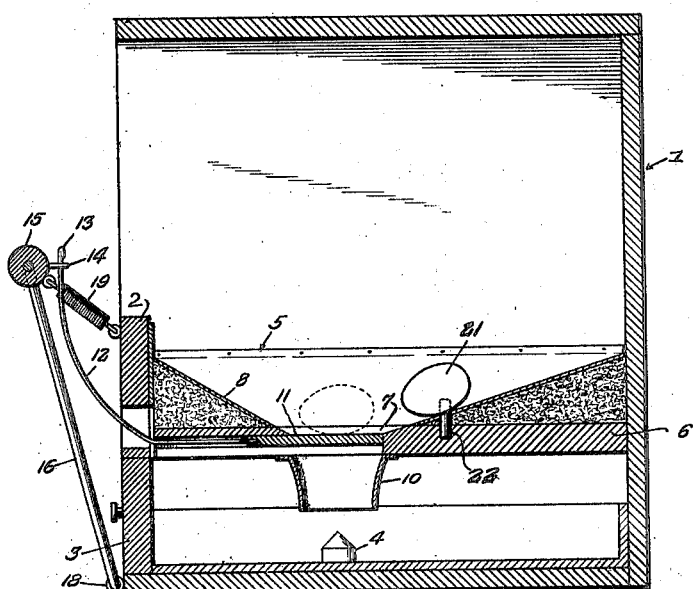
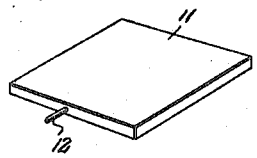
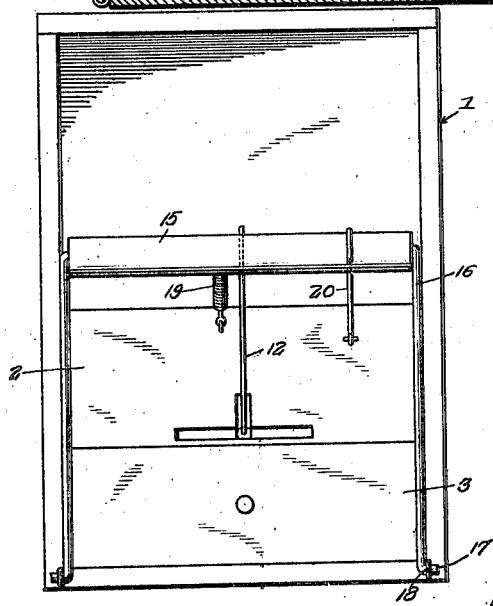
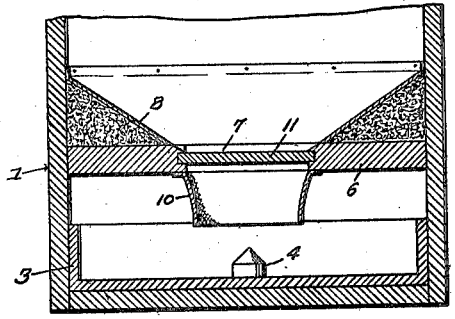
L. H. Johnson, INVENTOR.
BY Geo. F. Kimmel, ATTORNEY.

Patented Oct. 24, 1922.

1,433,460

UNITED STATES PATENT OFFICE.

LOUIS H. JOHNSON, OF DALTON, MISSOURI.

HEN'S NEST.

Application filed July 6, 1921. Serial No. 482,696.

*To all whom it may concern:*

Be it known that I, LOUIS H. JOHNSON, a citizen of the United States, residing at Dalton, in the county of Chariton and State of Missouri, have invented certain new and useful Improvements in Hens' Nests, of which the following is a specification.

This invention relates to hens' nests of the trap type.

The object of the invention is to provide a nest of this character so constructed that when the hen leaves the nest, a slide in the bottom thereof will open to discharge the egg laid.

Another object is to provide a simple and efficient slide actuating means whereby it will be opened by the hen leaving the nest and automatically closed after the egg is discharged.

Still another object is to provide a fixed artificial nest egg so located that it will not be discharged with the newly laid egg.

With these and other objects in view, the invention consists in certain novel features of construction as hereinafter shown, described and claimed.

In the accompanying drawings,

Figure 1 represents a longitudinal vertical section of a nest construction in accordance with this invention, with the slide in the bottom shown closed and an egg represented in dotted lines resting thereon, Fig. 2 is a front elevation thereof, Fig. 3 is a detail vertical section, taken on a plane at right angles to that shown in Fig. 1; and Fig. 4 is a detail perspective view of the slide used for closing the opening in the bottom of the nest.

The nest constituting this invention comprises a housing 1 which is closed at its top and on all sides except at the front, the front being closed for a part of the height of the housing. The front closure 2 extends for a part only of the housing, preferably terminating about midway the height thereof, as shown clearly in Figs. 1 and 2. A tray 3 is made in the form of a drawer slidable in the housing, and is designed to receive the eggs laid in the nest 5. This egg tray 3, may if desired, contain straw or other materials to prevent the eggs dropped into it from the breaking, and arranged at the center of the tray is an egg deflecting member 4, composed of cork, rubber, or other material which would not break an egg which hits against it.

A transverse partition 6 is arranged in the housing 1 above the tray 3, and is designed to support the nest 5, which may be of any desired or suitable material, having an opening 7 at the center thereof, the side walls 8 of the nest inclining downwardly toward this opening, so that an egg dropped on said walls will be directed toward the opening. An artificial nest egg 21 is fixedly mounted in the nest, being here shown carried by a peg 22 projecting upwardly from the partition 6 through the rear wall of the nest.

Depending from the lower face of the horizontal partition 6, around the central opening 7 formed therein, is an egg guiding tube 10, composed of flexible soft material which would avoid all tendency of breakage of the egg. This tube 10 receives the egg discharged from nest 5, in a manner presently to be described, and directs it against the deflector 4, which causes the egg hitting thereagainst to roll to one side in the tray 3 and be out of the way when the next egg is deposited.

A slide 11 is mounted in suitable guides in the partition 6, and normally closes the opening 7 in said partition, as is shown clearly in Figs. 1 and 3. A rod 12 is connected at one end with the slide 11 and extends through the front wall or closure 2 of the housing, and is bent upwardly and provided at its free end with a hook-shaped terminal 13, which is designed to be engaged with a staple or eye 14, carried by a cross bar or roller 15, which is mounted to swing vertically by means soon to be described.

The bar or roller 15, as herein shown, is carried by the cross bar of a U-shaped hanger 16 which is composed of heavy wire, with the free ends of the arms thereof bent laterally outward, as shown at 17, to form journals for the hanger and which are mounted in eyes 18, carried by the bottom of the housing.

A coil spring 19 is secured at one end to the rod or roller 15, and at its other end to the upper portion of the front closure 2, as is shown clearly in Fig. 1, and operates to normally hold the rod and the frame on which it is mounted in up-swung position, ready for a hen to perch thereon. When this frame and roller 15 are in up-swung position, as shown in Figs. 1 and 2, the slide 11 is in retracted closed position to receive the egg laid by the hen.

A suitable lock for holding the frame against tilting or downward swinging movement is provided, to be used when it is not desired to discharge the egg laid in the nest 5. As shown, the locking mechanism is composed of a hook 20, loosely attached at one end to the front face of the closure 2, and having the bill thereof designed to engage the roller 15, as shown clearly in Fig. 2, and hold the frame against tilting when a hen jumps on said roller.

In the use of this nest, the parts being in position shown in Fig. 1, a hen lighting on the cross bar 15 will swing the frame carrying said bar downwardly, and she may enter the front of the nest from this cross bar. When she so enters the nest, the bar will swing upwardly under the tension of the spring 19, and thereby close the slide 11. After the hen has laid the egg, shown in dotted lines in Fig. 1, in her exit from the nest, she must necessarily then jump on the cross bar or roller 15, which will cause said roller and the frame on which it is mounted to swing downwardly against the tension of spring 19, thereby drawing out the slide 11 and uncovering the opening 7 in the bottom of the nest. When this opening is uncovered the egg will drop through the guide tube 10 and on contacting with the deflector 4, will be directed to one side into the tray 3, and may be removed whenever it is desired to do so, any desired number may accumulate before removal, since they will not, in any way, be affected by hens successively entering the nest and laying therein, each egg dropping into the tray as the hen leaves the nest, thus preserving them and preventing them being addled by hens sitting on them.

When these nests are first installed, it is desirable that the tilting frame be held against tilting, until the hens get familiar with the nests and this is accomplished by means of the fastener 20 as above described.

Should any part of this nest get out of order the part can be easily removed and repaired or a new part substituted.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

In a nest of the class described a housing having an entrance opening in one wall thereof, a nest mounted in said housing adjacent said opening, said nest having a bottom opening centrally disposed, inclined walls extending toward said opening for directing an egg thereinto, a flexible egg guiding tube disposed below said opening and extending around it, a sliding closure for said opening, a rod secured to said closure, a swinging frame mounted on said housing adjacent the entrance opening and located in the path of the hen a connection between said frame and said rod whereby the movement of the frame in one direction will open said closure and close it in its movement in the opposite direction, and a coiled spring connected to normally hold said frame in upright operative position for closing the closure.

In testimony whereof, I affix my signature hereto.

LOUIS H. JOHNSON.